United States Patent [19]
Ho-Il

[11] Patent Number: 5,345,314
[45] Date of Patent: Sep. 6, 1994

[54] LASER BEAM PRINTING SYSTEM UTILIZING A PLURALITY OF CARTRIDGES

[75] Inventor: Seo Ho-Il, Kyung Ki-Do, Rep. of Korea

[73] Assignee: Hyundai Electronics Industries Co., Ltd., Inchon-Kunm, Rep. of Korea

[21] Appl. No.: 799,293

[22] Filed: Nov. 27, 1991

[30] Foreign Application Priority Data
Nov. 30, 1990 [KR] Rep. of Korea .................. 90-19632

[51] Int. Cl.⁵ .................. H04N 1/21; G01D 15/14; G06F 15/00; B41J 21/17
[52] U.S. Cl. .................. 358/296; 346/160; 400/70; 395/110; 395/115
[58] Field of Search ............ 358/296, 401, 443, 444; 346/108, 160; 395/110, 115, 150; 400/70

[56] References Cited

U.S. PATENT DOCUMENTS

| | | | |
|---|---|---|---|
| 4,660,998 | 4/1987 | Tsuneki | 400/70 X |
| 4,660,999 | 4/1987 | Tsuneki | 400/70 X |
| 4,763,281 | 8/1988 | Arakawa | 400/61 X |
| 4,901,249 | 2/1990 | Shiota | 400/72 X |
| 4,954,968 | 9/1990 | Yamaguchi et al. | 364/519 |
| 5,051,925 | 9/1991 | Kadono et al. | 364/519 |
| 5,150,456 | 9/1992 | Wu et al. | 395/110 X |
| 5,175,821 | 12/1992 | Dutcher et al. | 395/110 X |
| 5,195,176 | 3/1993 | Lung | 395/115 |
| 5,201,031 | 4/1993 | Kasaki | 395/110 |

Primary Examiner—Benjamin R. Fuller
Assistant Examiner—Eric Frahm
Attorney, Agent, or Firm—McGlew & Tuttle

[57] ABSTRACT

A LBP system having a Hangle, Chinese character and alphabetical character printing function, including a video controller in a LBP body including a main circuit for providing address and data, a memory access control logic unit connected to the main circuit, for accessing common external memories and first and second cartridge connectors connected respectively to the main circuit and the memory access control logic unit. An alphabetical character emulation software cartridge and an alphabetical character font cartridge are connected in parallel to the first cartridge connector. A specific cartridge is provided for including a cartridge memory control logic unit for controlling only corresponding data in the cartridge memory. The specific cartridge may be any one of a Hangle font cartridge, a Chinese character font cartridge, a Hangle/Chinese character font cartridge and a Hangle/Chinese character emulation cartridge. Therefore, in accordance with the present invention, the Hangle and Chinese character fonts and the Hangle and Chinese character printing emulation program codes can optionally be used by optionally mounting and exchanging corresponding cartridges outside the system.

13 Claims, 9 Drawing Sheets

| SIGNAL | INPUT SIGNAL | | | OUTPUT SIGNAL | |
|---|---|---|---|---|---|
| CLASS OF MEMORY ACCESS | A0 | RD | HIGH-ORDER BYTE SELECT SIGNAL | HIGH-ORDER BYTE SELECT SIGNAL | LOW-ORDER BYTE SELECT SIGNAL |
| WORD ACCESS | 1 | 1 | 1 | 1 | 1 |
| BYTE ACCESS — EVEN BYTE ACCESS | 1 | 1 | 0 | 0 | 1 |
| BYTE ACCESS — ODD BYTE ACCESS | 0 | 1 | 1 | 1 | 0 |

FIG. 4

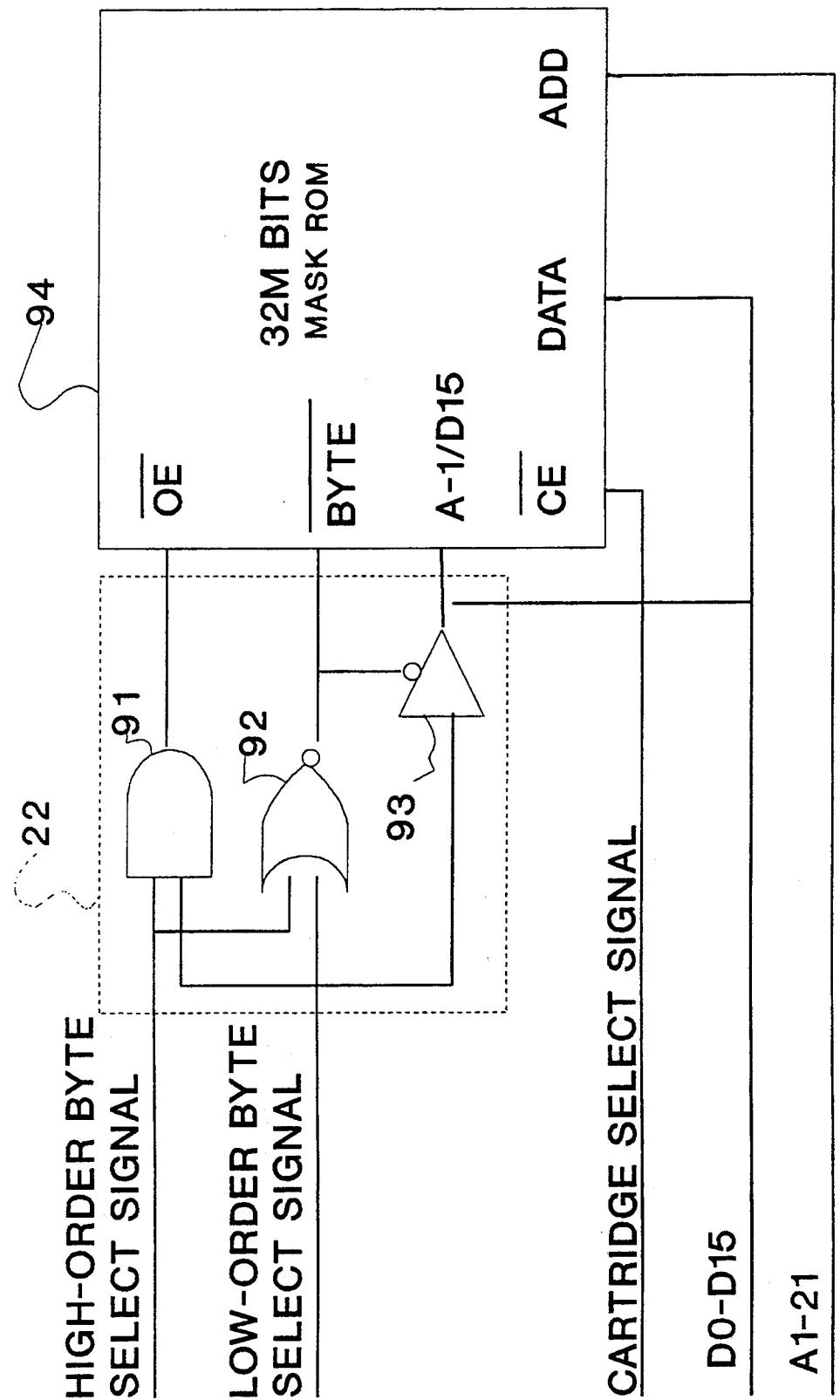

LASER BEAM PRINTING SYSTEM UTILIZING A PLURALITY OF CARTRIDGES

FIELD OF THE INVENTION

The present invention relates in general to a laser beam printer (LBP) system having a Hangle, Chinese character and alphabetical character printing function, and more particularly to a LBP system for embodying Hangle and Chinese character fonts and Hangle and Chinese character printing emulation program codes in a cartridge manner utilizing a large scale integrated mask ROM and a small outline package (SOP) type device, so that the Hangle and Chinese character fonts and the Hangle and Chinese character printing emulation program codes can optionally be used by optionally mounting and exchanging corresponding cartridges outside the system.

BACKGROUND OF THE INVENTION

Generally, a conventional LBP system having a Hangle, Chinese character and alphabetical character printing function comprises a separate Chinese character font printed circuit board (PCB) separately mounted on a video controller PCB therein through a connection by a PCB connector. The separate Chinese character font board is mainly comprised of an erasable and programmable read only memory (EPROM).

However, the conventional LBP system has disadvantages as follows:

First, when several users purchase individual LBPs for use in the same office, it is inconvenient for the users to use the Chinese character font board in common in the individual LBPs. Therefore, in order to solve the inconvenience, the users must make an overlapping investment for the high price Chinese character font board. Second, since the conventional Chinese character font board is provided with the high price EPROM, it is high in price and large in size. Also, the conventional Chinese character font board is increased in total price, in that the PCB connector must separately be used for its connection to the video controller board. Third, since the Chinese character font board takes additional possession of the video controller board in addition to a video controller, an extended memory board or an extended I/O board is hard to mount on the video controller board in accordance with a requirement of the user using the Hangle and Chinese characters, Fourth, although the Hangle or Chinese character fonts will variously be developed, it is inconvenient for the user to substitute the developed Hangle or Chinese character fonts for the existing fonts. Also, even when different types of printing emulation functions are added, it will be impossible for the user to readily add the different combined types of printing emulation functions to the existing emulation function outside the LBP. Moreover, it is impossible to separately produce a module having the emulation function.

SUMMARY OF THE INVENTION

Therefore, the present invention has been made in view of the above problems, and it is an object of the present invention to provide a LBP system having a compact cartridge which is designed utilizing a 4 megabits mask ROM, a 16 megabits mask ROM or a 32 megabits mask ROM, all being of a SOP type, and readily mountable to the system on the outside the system.

It is another object of the present invention to provide a LBP system in which a memory control logic is divided into two parts so that a Hangle/Chinese character cartridge, a Hangle cartridge or a Chinese character cartridge can be used together with an alphabetical character font cartridge and an alphabetical character emulation software cartridge.

In accordance with the present invention, the above objects can be accomplished by providing a LBP system having a Hangle, Chinese character and alphabetical character printing function, comprising: video controller means in a LBP body including main means for providing address and data, memory access control logic means connected to said main means, for accessing a plurality of external memories in common, and first and second cartridge connecting means connected respectively to said main means and said memory access control logic means; an alphabetical character emulation software cartridge and an alphabetical character font cartridge connected in parallel to said first cartridge connecting means; and a specific cartridge including a cartridge memory for storing specific font data and emulation data and cartridge memory control logic means for controlling only corresponding data in said cartridge memory.

The above and other objects, features and advantages of the present invention will be more clearly understood from the following detailed description taken in conjunction with the accompanying drawings.

BRIEF DESCRIPTION OF THE DRAWINGS

FIG. 4 illustrates the operation of a memory access control logic unit in FIG. 3;

FIG. 9 is a functional block diagram of the Hangle/Chinese character font cartridge having the four megabytes memory in accordance with still another embodiment of the present invention.

DETAILED DESCRIPTION OF PREFERRED EMBODIMENTS

Figure 1:
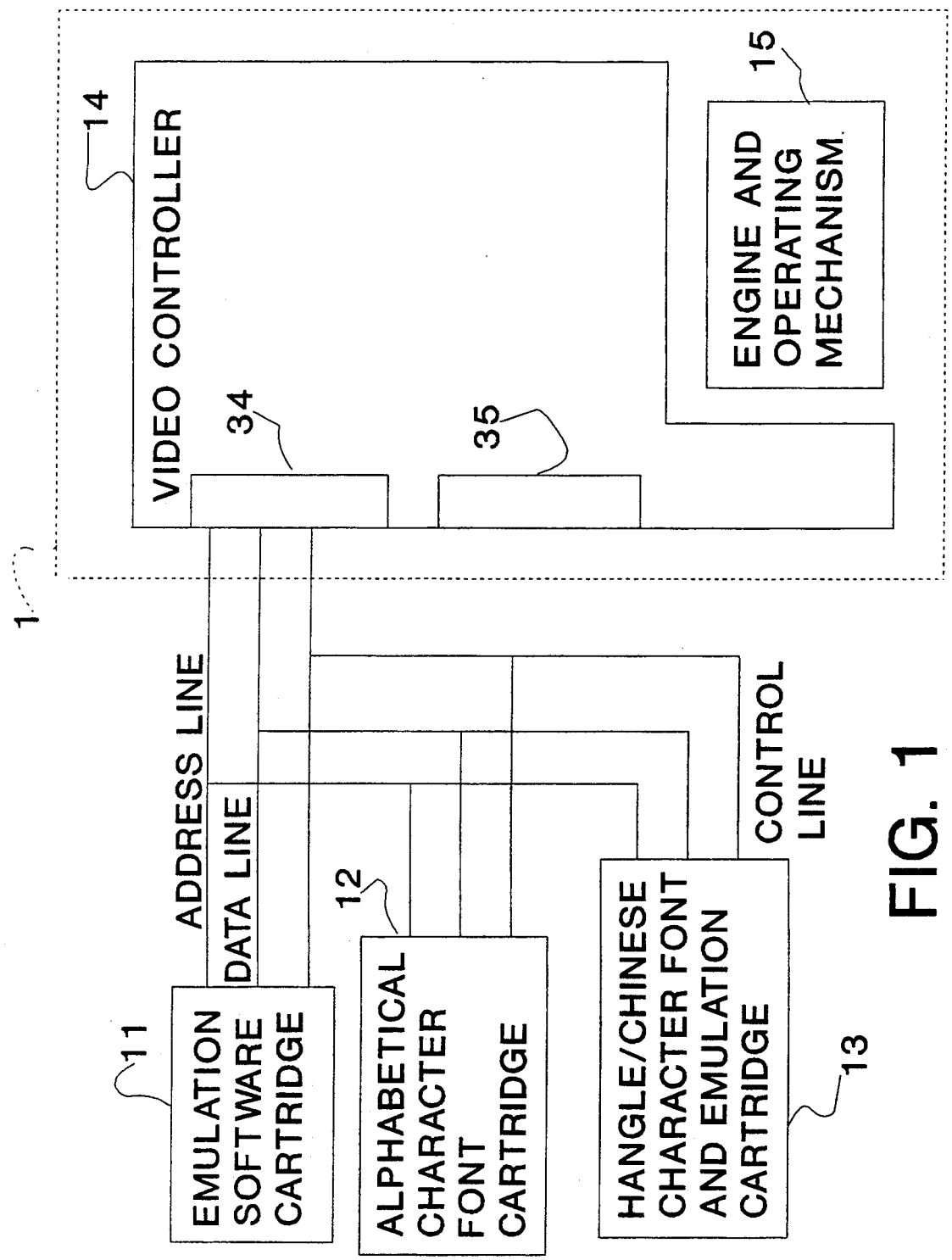
FIG. 1 is a schematic diagram of a LBP system of the present invention.

With reference to FIG. 1, there is shown a schematic diagram of a LBP system of the present invention. As shown in this drawing, the LBP system of the present invention comprises a video controller 14 having cartridge connectors 34 and 35 therein, an alphabetical character emulation software cartridge 11 and an alphabetical character font cartridge 12 connected in parallel to the cartridge connector 34 in the video controller 14.

Also, the LBP system of the present invention comprises another cartridge 13 mounted to the cartridge connectors 34 and 35 in the video controller 14 outside the LBP system in accordance with selection of the user. Herein, the cartridge 13 may be a Hangle font cartridge, a Chinese character font cartridge, a Hangle/Chinese character font cartridge and a Hangle/Chinese character emulation cartridge and will hereinafter be referred to as the Hangle/Chinese character font cartridge. Also, the reference numeral 15, designates an engine and operating mechanism.

Figure 3:
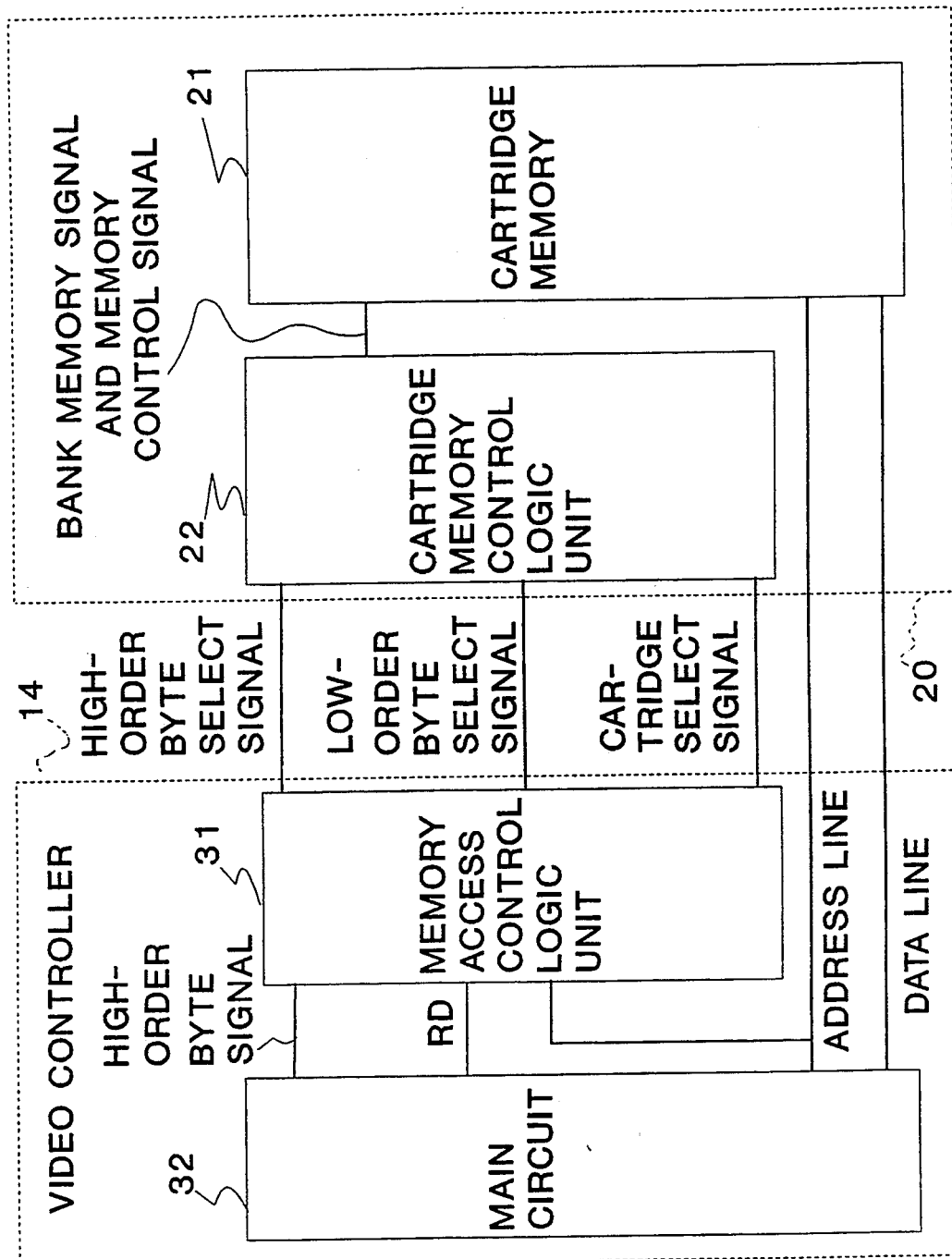
FIG. 3 is a detailed block diagram of the LBP system in FIG. 1.

For the use of the Hangle/Chinese character font cartridge 13 with the alphabetical character emulation software cartridge 11 and the alphabetical character font cartridge 12, a memory control logic is divided into two parts as shown in FIG. 3. One part is performed by a memory access control logic unit 31 in the video controller 14, while the other part is performed by a cartridge memory control logic unit 22 in the Hangle/Chinese character font cartridge 13. The memory access control logic unit 31 functions to access memories in the cartridges. Also, the cartridge memory control logic unit 22 functions to control the corresponding memory in the corresponding cartridge and varies according to the kind of cartridges. These components 22 and 31 will be described later in detail.

Figure 2:
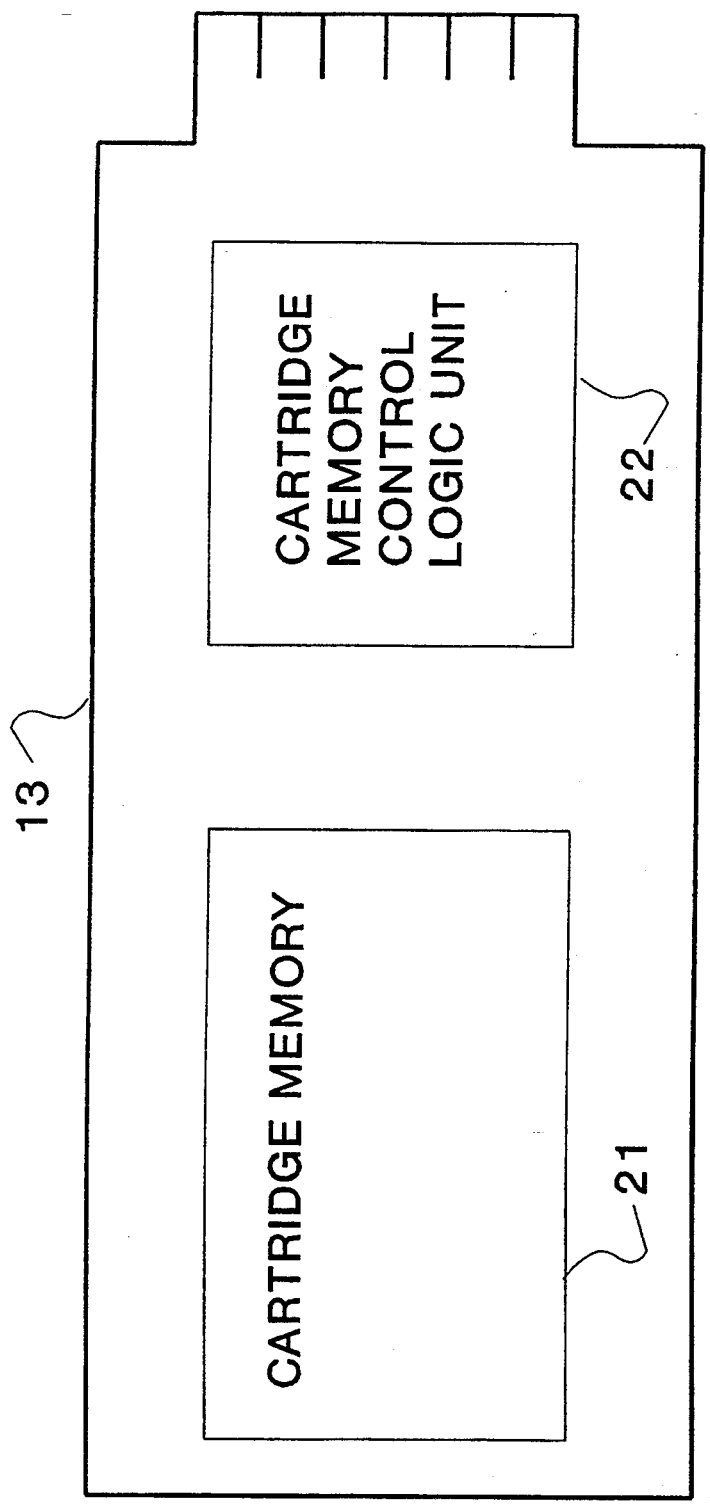
FIG. 2 is a schematic diagram of a Hangle/Chinese character font cartridge in FIG. 1.

With reference to FIG. 2, there is shown a schematic diagram of the Hangle/Chinese character font cartridge 13 in FIG. 1. As shown in the drawing, the Hangle/Chinese character font cartridge 13 includes a cartridge memory 21 which is provided with a large scale integrated mask ROM of 4 megabits or more and the cartridge memory control logic unit 22 which is provided with a plurality of SOP type devices.

With reference to FIG. 3, there is shown a detailed block diagram of the LBP system in FIG. 1. As shown in this drawing, the video controller 14 in the LBP system of the present invention comprises the memory access control logic unit 31 and a main circuit 32 having a main control function with regard to the video controllet 14. The main circuit 32 is coupled to the memory access control logic unit 31 . The main circuit 32 also includes an address line and a data input/output line and also supplies a high-order byte signal , a read signal RD and an address signal to the memory access control logic unit 31. Also, the video controller 14 comprises the cartridge connectors 34 and 35 connected respectively to the memory access control logic unit 31 and the main circuit 32.

In accordance with the present invention, the memory access control logic unit 31 is provided in the video controller 14 such that words, odd bytes and even bytes are selectively accessible according to using purposes. Also, the cartridge memory control logic unit 22 is provided in the cartridge 13 such that the cartridge memory is operable according to the corresponding cartridge 13 regardless of the kind of the cartridges 13.

The Hangle/Chinese character font cartridge 20 in the LBP system is provided with the cartridge memory control logic unit 22 connected to the cartridge connectors 34 and 35 in the video controller 14 for receiving a high-order byte select signal, a low-order byte select signal and a cartridge select signal from the memory access control logic unit 31 in the video controller 14 through the cartridge connectors 34 and 35. A cartridge memory 21 in the font cartridge 20 is connected to the cartridge memory control logic unit 22 for receiving a bank memory signal and a memory control signal therefrom. Also, the cartridge memory 21 receives the address and data from the main circuit 32 in the video controller 14.

The memory access control logic unit 31 functions to access memories in the common cartridges. Upon receiving the high-order byte signal, read signal RD and address signal from the main circuit 32, the memory access control logic unit 31 selects a word access (16 bits read) or a byte access (8 bits read) in accordance with characteristics of the received signals and sends the high-order byte select signal, low-order byte select signal and cartridge select signal based on the selected result to the cartridge memory control logic unit 22 in the cartridge 13 through the cartridge connectors 34 and 35. The byte access may be classified into an odd byte access and an even byte access according to using purposes.

With reference to FIG. 4, there is shown the operation of the memory access control logic unit 31 in FIG. 3.

The operation of the memory access control logic unit 31 will now be mentioned with reference to FIG. 4.

The memory access control logic unit 31 selects the word access when address signal A0 is logic 1, the high-order byte signal is logic 1 and the read signal RD is logic 1. Upon selection of the word access, the memory access control logic unit 31 sends the high-order byte select signal and low-order byte select signal through the cartridge connectors 34 and 35, both select signals logic 1. Also, the memory access control logic unit 31 selects the even byte access when the address signal A0 is logic 1, the high-order byte signal is logic 0 and the read signal RD is logic 1. Upon selection of the even byte access, the memory access control logic unit 31 sends the high-order byte select signal of logic 0 and low-order byte select signal of logic 1 through the cartridge connectors and 35. On the other hand, the memory access control logic unit 31 selects the odd byte access when the address signal A0 is logic 0, the high-order byte signal is logic 1 and the read signal RD is logic 1. Upon selection of the odd byte access, the memory access control logic unit 31 sends the high-order byte select signal of logic 1 and low-order byte select signal of logic 0 through the cartridge connectors 34 and 35.

The cartridge memory control logic unit 22 functions to control the corresponding memory in the corresponding cartridge and has a variation as the kind of cartridges. When the cartridge select signal sent through the cartridge connectors 34 and 35 from the memory access control logic unit 31 is logic 1, the cartridge memory control logic unit 22 can access a required memory bank in accordance with a selection of the address line. At this time, the cartridge memory control logic unit 22 applies the bank memory signal to the cartridge memory 21 such that it reads data from a memory location, or a group of memory units corresponding to the selected bank.

Figure 5:
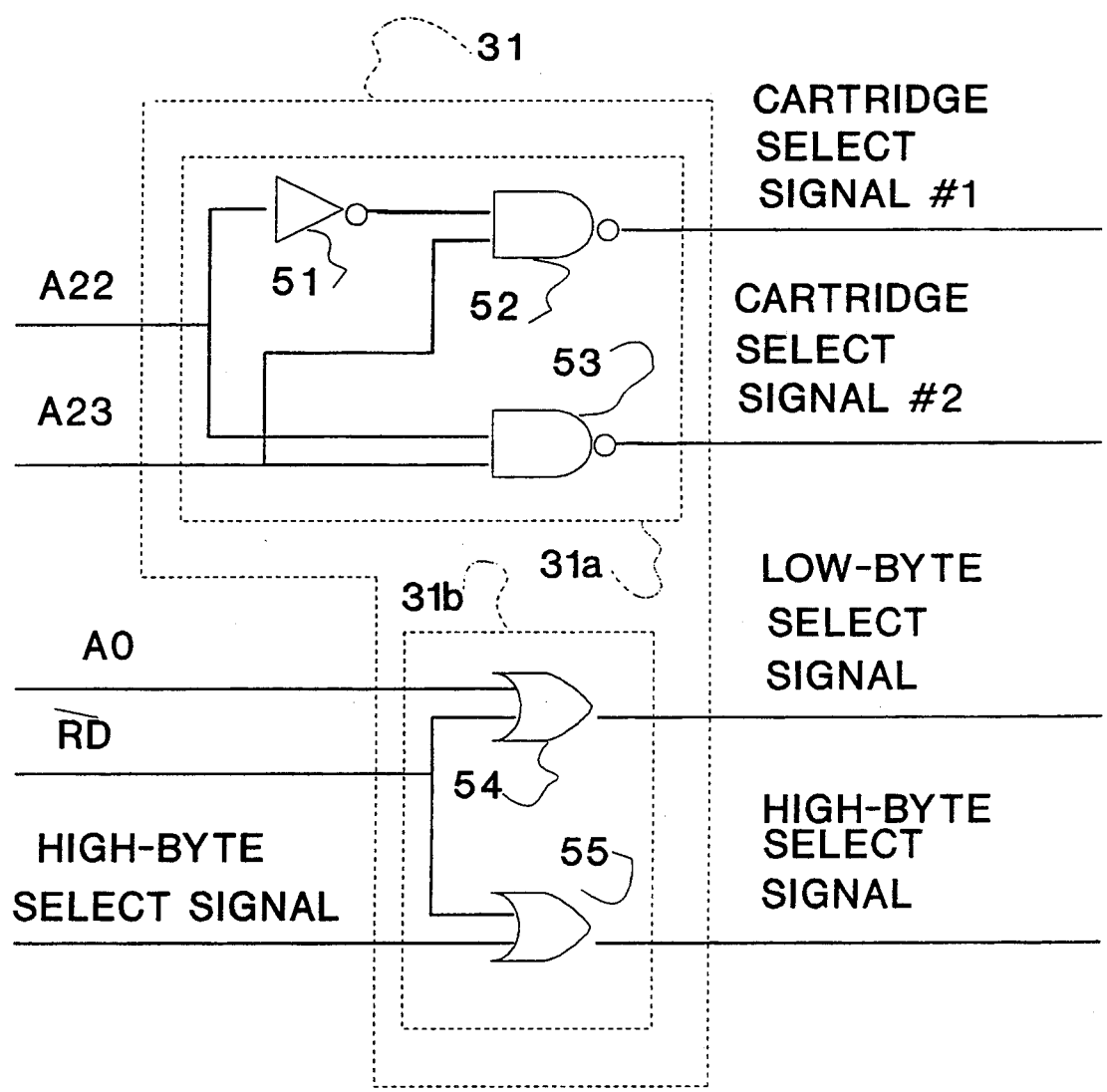
FIG. 5 is a functional block diagram of the memory access control logic unit in FIG. 3 in accordance with an embodiment of the present invention.

With reference to FIG. 5, there is shown a functional block diagram of the memory access control logic unit 31 in FIG. 3 in accordance with an embodiment of the present invention. As shown in this drawing, the memory access control logic unit 31 is provided with a cartridge select signal processing unit 31a and a high/low order byte select signal processing unit 31b.

The cartridge select signal processing unit 31a includes an inverter 51 for inverting address signal A22, a NAND gate 52 for NANDing an output signal from the inverter 51 and address signal A23 to output cartridge select signal #1, and a NAND gate 53 for NANDing the address signals A22 and A23 to output cartridge select signal #2. Also, the high/low order byte select signal processing unit 31b includes an OR gate 54 for ORing the address signal A0 and the read signal $\overline{RD}$ to output the low-order byte select signal, and an OR gate 55 for ORing the read signal $\overline{RD}$ and the high-order byte signal $\overline{HB}$ from the main circuit 32 to output the high-order byte select signal.

The cartridge select signal processing unit 31a may include an I/O decoder gate. If the address signal s A23 and A22 for selecting the cartridges #1 and #2 are logic 1 and logic 0 respectively, the addressable cartridge memory location is selected from B00000 to BFFFFF and the cartridge select signal #1 becomes low (logic 1). On the other hand, If the address signals A23 and A22 are logic 1 and logic 1 respectively, the addressable cartridge memory location is selected from C00000 to FFFFFF and the cartridge select signal #2 becomes low (logic 1). Respective low states of the read signal $\overline{RD}$, high-order byte signal HBE, high-order byte select signal and low-order byte select signal are logic 1, corresponding to respective logic 1 of the read signal RD, high-order byte signal, high-order byte select signal and low-order byte select signal as shown in FIG. 4. Also, respective high states of the read signal $\overline{RD}$, high-order byte signal $\overline{HBE}$, high-order byte select signal and low-order byte select signal are logic 0, corresponding to respective logic 0 of the read signal RD, high-order byte signal , high-order byte select signal and low-order byte select signal as shown in FIG. 4. Namely, logics 1 and 0 of the signals of FIG. 5 correspond to those of the signals of FIG. 4. Similarly, the low state of the address signal A0 is logic 1, while the high state thereof is logic 0, corresponding to logics 1 and 0 of that of FIG. 4.

Figure 6:
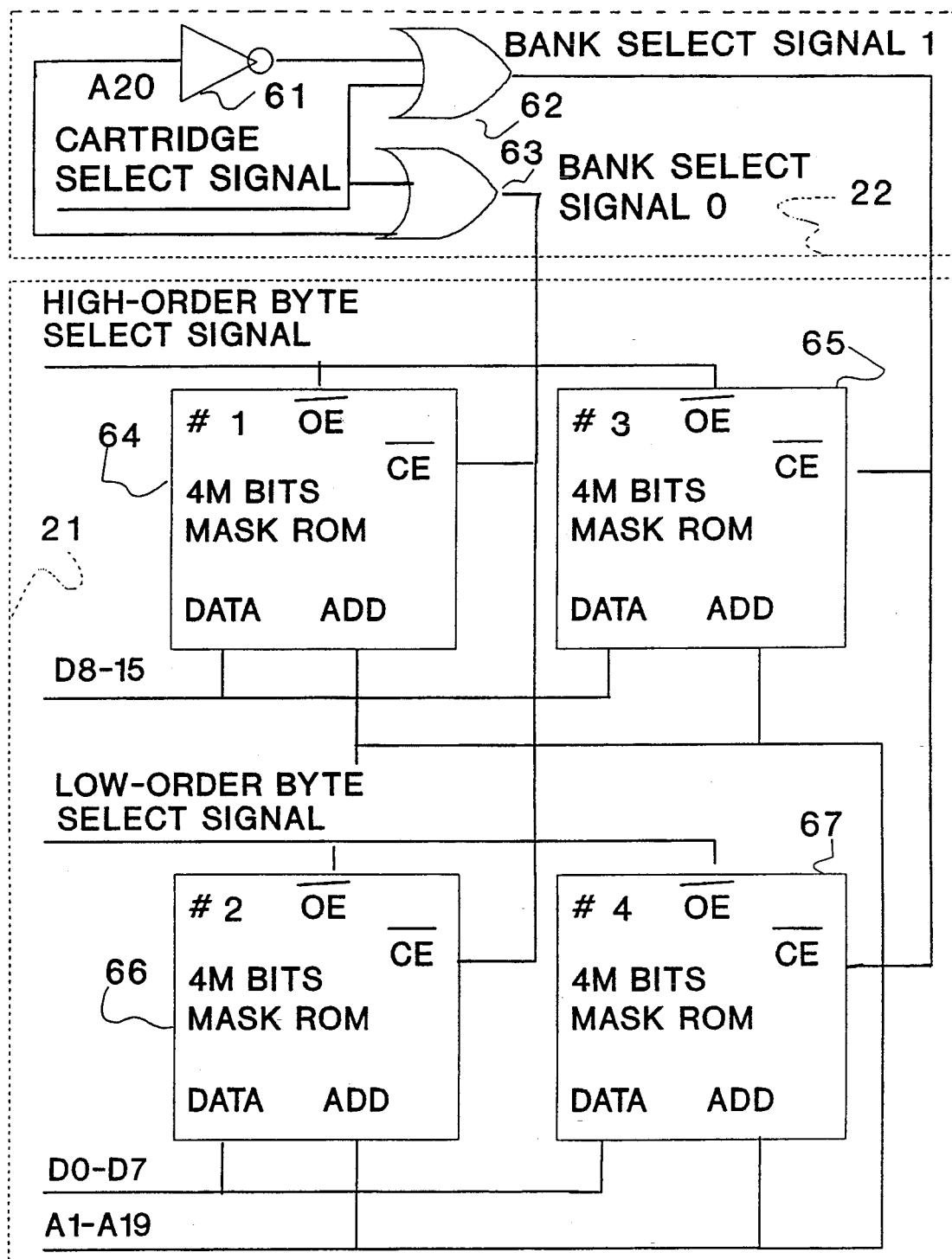
FIG. 6 is a functional block diagram of the Hangle/Chinese character font cartridge having a two megabytes memory in accordance with the embodiment of the present invention.

With reference to FIG. 6, there is shown a functional block diagram of the Hangle/Chinese character font cartridge 13 having the cartridge memory 21 of two megabytes in accordance with the embodiment of the present invention, wherein a group of four mask ROMs, each being of four megabits, are utilized as the cartridge memory 21. As shown in this drawing, the cartridge memory control logic unit 22 in the Hangle/Chinese character font cartridge 13 includes an inverter 61 for inverting a specific address signal A20, an OR gate 62 for ORing an output signal from the inverter 61 and the cartridge select signal to output a bank select signal 1, and an OR gate 63 for ORing the address signal A20 and the cartridge select signal to output a bank select signal 0. Also, the cartridge memory 21 in the Hangle/Chinese character font cartridge 13 includes four mask ROMs 64 through 67, each being of four megabits. The high-order byte select signal is applied directly to $\overline{OE}$ terminals of the four megabits mask ROMs 64 and 65 and the low-order byte select signal is applied directly to $\overline{OE}$ terminals of the four megabits mask ROMs 66 and 67. When the address signal A20 for selecting a data bank is low and the cartridge select signal is low, the bank select signal 0 is selected as a low signal (logic 1) and is then applied from the OR gate 63 to $\overline{CE}$ terminals of the four megabits mask ROMs 64 and 66. Otherwise, when the address signal A20 is high and the cartridge select signal is low, the bank select signal 1 is selected as a low signal (logic 1) and then is applied from the OR gate 62 to $\overline{CE}$ terminals of the four megabits mask ROMs 65 and 67.

Figure 7:
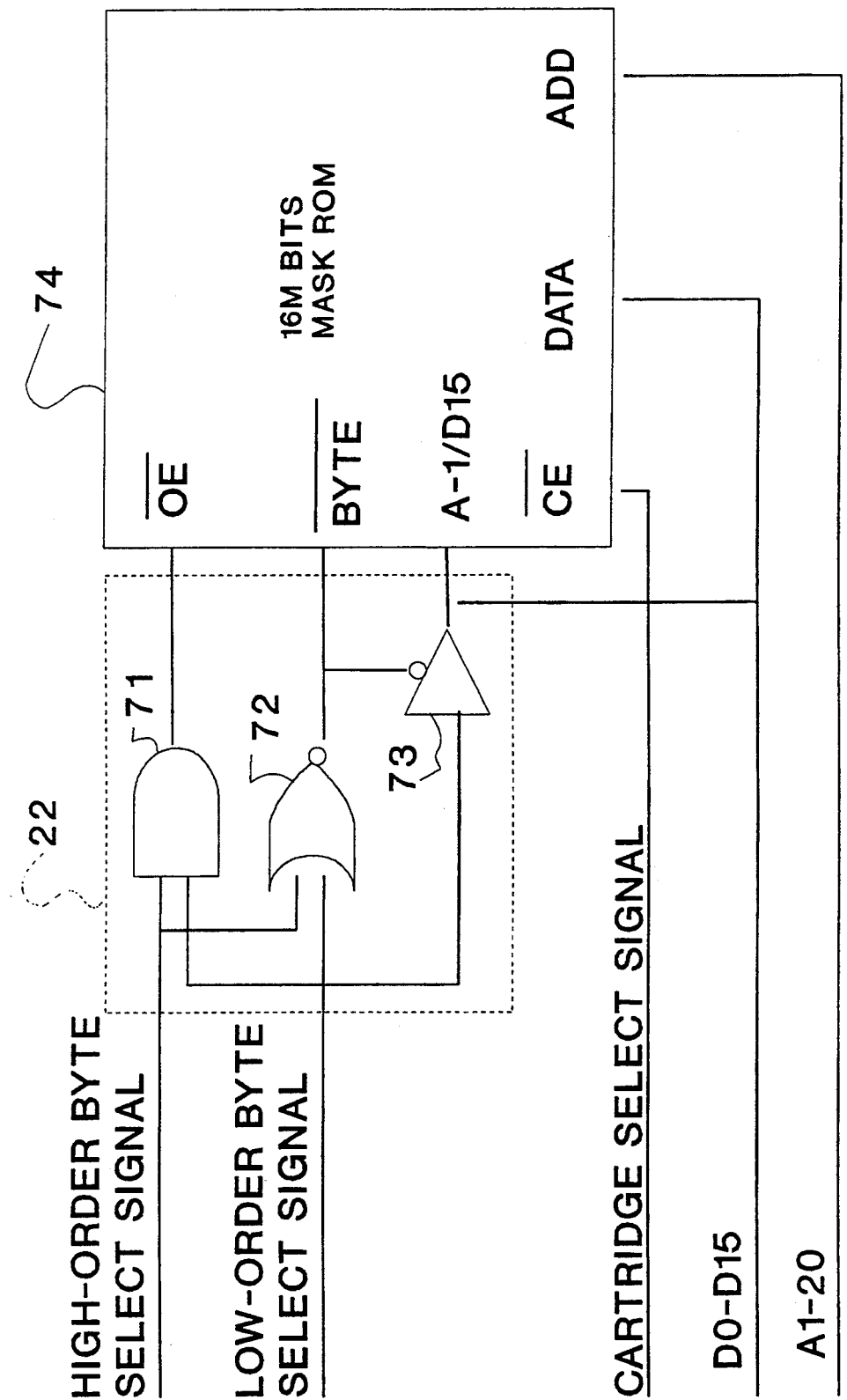
FIG. 7 is a functional block diagram of the Hangle/Chinese character font cartridge having the two megabytes memory in accordance with an alternative embodiment of the present invention.

With reference to FIG. 7, there is shown a functional block diagram of the Hangle/Chinese character font cartridge 13 having the cartridge memory 21 of two megabytes in accordance with an alternative embodiment of the present invention, wherein a sixteen megabits mask ROM is utilized as the cartridge memory 21. As shown in this drawing, the cartridge memory control logic unit 22 in the Hangle/Chinese character font cartridge 13 includes an AND gate 71 for ANDing the high-order byte select signal and the low-order byte select signal, a NOR gate 72 for NORing the high-order byte select signal and the low-order byte select signal, and a tri-state buffer 73 including its control terminal connected to output terminal of the NOR gate 72 and its input terminal for inputting the high-order byte select signal. Also, the cartridge memory 21 in the Hangle/Chinese character font cartridge 13 is provided with a sixteen megabits mask ROM 74. If the high-order byte select signal or the low-order byte select signal is low, the output signal from the AND gate 71 becomes low, thereby enabling an $\overline{OE}$ signal at an $\overline{OE}$ terminal of the sixteen megabits mask ROM 74. A $\overline{BYTE}$ signal at a $\overline{BYTE}$ terminal of the sixteen megabits mask ROM 74 is a memory input signal. When the $\overline{BYTE}$ signal is low, the byte access is enabled, while it is high, the word access is enabled. As a result, if the high-order byte select signal and the low-order byte select signal are low, the output signal from the NOR gate 72 becomes high, thereby allowing the $\overline{BYTE}$ signal to become high enabling the word access. On the other hand, if the high-order byte select signal or the low-order byte select signal is high, the output signal from the NOR gate 72 becomes low, thereby allowing the $\overline{BYTE}$ signal to become low enabling the byte access. Also, an A-1/D15 terminal of the sixteen megabits mask ROM 74 outputs a D15 data signal upon the word access, while inputs a least significant bit (LSB) address signal upon the byte access. Due to the input/output operation of the A-1/D15 terminal of the sixteen megabits mask ROM there may occur a conflict of the D15 data signal and the LSB address signal with the high-order byte select signal. For the purpose of solving the conflict, the tri-state buffer 73 is used. That is, since the output signal from the NOR gate 72 is high upon the byte access, the tri-state buffer 73 is turned off, resulting in only outputting the D15 data signal to the data line. On the other hand, if the low-order byte select signal is high, odd byte addresses are accessible, while even byte addresses are accessible if the low-order byte select signal is low. Also, the cartridge select signal is inputted directly to a $\overline{CE}$ terminal of the sixteen megabits mask ROM 74.

Figure 8:
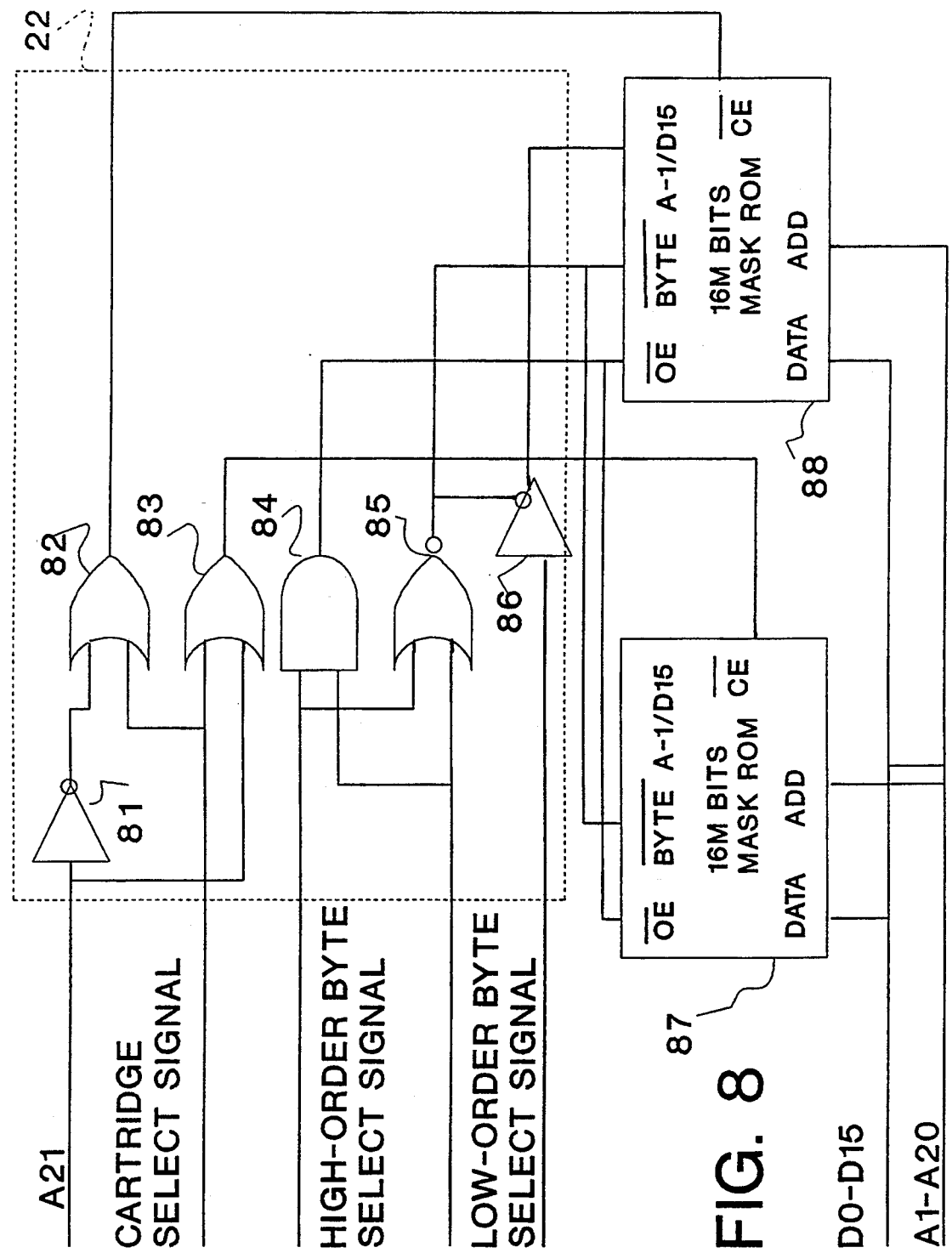
FIG. 8 is a functional block diagram of the Hangle/Chinese character font cartridge having a four megabytes memory in accordance with another embodiment of the present invention.

With reference to FIG. 8, there is shown a functional block diagram of the Hangle/Chinese character font cartridge 13 having the cartridge memory 21 of four megabytes in accordance with another embodiment of the present invention, wherein a pair of mask ROMs, both being of sixteen megabits, are utilized as the cartridge memory 21. The cartridge in this drawing may readily be embodied in those in FIG. 6 and 7. As shown in this drawing, the cartridge memory control logic unit 22 in the Hangle/Chinese character font cartridge 13 includes an inverter 81 for inverting a specific address signal A21, an OR gate 82 for ORing an output signal from the inverter 81 and the cartridge select signal to output a bank select signal 1, an OR gate 83 for ORing the address signal A21 and the cartridge select signal to output a bank select signal 0, an AND gate 84 for ANDing the high-order byte select signal and the low-order byte select signal, a NOR gate 85 for NORing the high-order byte select signal and the low-order byte select signal, and a tri-state buffer 86 including its control terminal connected to output terminal of the NOR gate 85 and its input terminal for inputting the high-order byte select signal. Also, the cartridge memory 21 in the Hangle/Chinese character font cartridge 13 is provided with a pair of sixteen megabits mask ROMs 87 and 88. OE, $\overline{\text{BYTE}}$ and A-1/D15 terminals of the sixteen megabits mask ROMs 87 and 88 are accessed in the same manner as that of FIG. 7, On the other hand, When the address signal A21 for selecting a data bank is low and the cartridge select signal is low, the bank select signal 0 is selected as a low signal (logic 1) and is then applied from the OR gate 83 to a $\overline{\text{CE}}$ terminal of the sixteen megabits mask ROM 87. Otherwise, when the address signal A20 is high and the cartridge select signal is low, the bank select signal 1 is selected as a low signal (logic 1) and then is applied from the OR gate 82 to a $\overline{\text{CE}}$ terminal of the sixteen megabits mask ROM 88.

With reference to FIG. 9, there is shown a functional block diagram of the Hangle/Chinese character font cartridge 13 having the cartridge memory 21 of four megabytes in accordance with still another embodiment of the present invention, wherein a thirty-two megabits mask ROM 94 is utilized as the cartridge memory 21. As shown in this drawing, the construction of the cartridge memory control logic unit 22 in the Hangle/Chinese character font cartridge 13 may be the same as that of FIG. 7. OE, $\overline{\text{BYTE}}$ and A-1/D15 terminals of the thirty-two megabits mask ROM 94 are accessed i n the same manner as that of FIG. 7, But, addresses A1–A21 are applied to an address terminal of the thirty-two megabits mask ROM 94. The cartridge select signal is inputted directly to a $\overline{\text{CE}}$ terminal of the thirty-two megabits mask ROM 94.

From the above description, it can be seen that the Hangle font cartridge, Chinese character font cartridge, Hangle/Chinese character font cartridge and Hangle/Chinese character emulation cartridge can be used in common with the alphabetical character font cartridge and alphabetical character emulation software cartridge, through their connection to connectors of the alphabetical character cartridges. Also, the Hangle font cartridge, Chinese character font cartridge, Hangle/Chinese character font cartridge and Hangle/Chinese character emulation cartridge can readily be exchanged outside the LBP in accordance with a selection of the user. Moreover, in the case where several LBPs are used, a set of Hangle font cartridge, Chinese character font cartridge, Hangle/Chinese character font cartridge and Hangle/Chinese character emulation cartridge can be used in common. In addition, since the word access, the even byte access and the odd byte access are enabled according to using purposes, an optional access to the cartridge memory is enabled. Therefore, the memory units in the cartridge memory can be reduced in number.

Also, instead of the Hangle font cartridge, Chinese character font cartridge, Hangle/Chinese character font cartridge and Hangle/Chinese character emulation cartridge as shown in FIG. 2, an emulation/font integral cartridge may be used. This emulation/font integral cartridge can be embodied by containing a memory in which is stored a software program code having a finished type (KS mode) or a combined type of Hangle/Chinese character emulation function, with a font memory corresponding to the Hangle font cartridge, Chinese character font cartridge and Hangle/Chinese character font cartridge. Also, a separate Hangle/Chinese character emulation cartridge may be used which contains only memory in which is stored the software program code having the finished type or the combined type of Hangle/Chinese character emulation function. This separate Hangle/Chinese character emulation cartridge is connected to the cartridge connectors 34 and 35 together with separate Hangle font cartridge, Chinese character font cartridge or Hangle/Chinese character font cartridge.

In another manner, the Hangle/Chinese character emulation and font contents which are mainly used may be stored in an internal memory in the video controller 14, while Hangle/Chinese character emulation and font contents being optionally used may be stored respectively in the Hangle/Chinese character emulation cartridge and the Hangle font cartridge, Chinese character font cartridge or Hangle/Chinese character font cartridge.

As hereinbefore described, in accordance with the present invention, the LBP system employing the Hangle/Chinese character font cartridge has advantages as follows:

First, when several users purchase individual LBPs for use in the same office, it is convenient for the users to use the Chinese character font cartridge commonly in the individual LBPs.

Second, since the Chinese character font memory is provided with the large scale integrated mask ROM, the Chinese character font PCB is significantly reduced in size and is reduced in price due to the low price of the mask ROM in comparison with EPROM. Also, the Chinese character font cartridge is significantly reduced in total price, in that it is connected to the existing alphabetical character font cartridge connector.

Third, an extended memory board or an extended I/O board is mountable in the area on the video controller board which the Chinese character font board has used in the prior art.

Fourth, when the user purchases an additional new model of LBP, he or she does not have to make an overlapping investment in the Chinese character font board, Fifth, when the Hangle or Chinese character fonts are variously developed, it is convenient for the user to substitute the developed Hangle or Chinese character fonts for the existing fonts.

Sixth, a manufacturing process of the Chinese character font cartridge may be separated from that of the video controller. As a result, the manufacturing process is simplified and the manufacturing cost is reduced.

Seventh, when different types of printing emulation functions are added, the user is able to readily add the different types of printing emulation functions to the existing emulation function outside the LBP.

Eighth, the present invention, in addition to the LBP system employing Hangle font, Chinese character font, Hangle/Chinese character font and emulation functions, may be applied to a laser facsimile, an intelligent copier and etc.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A laser beam printer system having a Hangle, Chinese character and alphabetical character printing function, comprising:
   a video controller card including main means for providing addresses and data, cartridge connecting means connected to said main means for connecting cartridges to said video controller card;
   an alphabetical character emulation software cartridge and an alphabetical character font cartridge both connected in parallel with each other to said cartridge connecting means; and
   another cartridge connected to said video controller card by said cartridge connecting means and in parallel with said alphabetical character emulation software cartridge and said alphabetical character font cartridge, including a cartridge memory for storing specific font data and emulation data, said another cartridge also including cartridge memory control logic means for controlling data in said another cartridge memory;
   said video controller card also including memory access control logic means connected to said main means, for accessing a plurality of external memories in said another cartridge, said alphabetical character emulation software cartridge, and said alphabetical character font cartridge, said memory access control logic means also being connected to another an additional cartridge connecting means for connecting additional cartridges to said video controller card.

2. A printer system having a Hangle, Chinese character and alphabetical character printing function, as set forth in claim 1, wherein said another cartridge is any one of a Hangle font cartridge, a Chinese character font cartridge, a Hangle, Chinese character font cartridge and a Hangle, Chinese character emulation cartridge.

3. A printer system having a Hangle, Chinese character and alphabetical character printing function, as set forth in claim 1, wherein said another cartridge is an emulation/font integral cartridge which contains a memory in which is stored a software program code having a Hangle, Chinese character emulation function, with a font memory corresponding to a Hangle font cartridge, a Chinese character font cartridge or a Hangle, Chinese character font cartridge.

4. A printer system having a Hangle, Chinese character and alphabetical character printing function, as set forth in claim 1, wherein said another cartridge is provided with a Hangle, Chinese character emulation cartridge which contains only memory in which is stored a software program code having a Hangle, Chinese character emulation function, and any one of a Hangle font cartridge, a Chinese character font cartridge and a Hangle, Chinese character font cartridge, said Hangle, Chinese character emulation cartridge and said selected font cartridge being connected respectively to said first and second cartridge connecting means in said video controller means.

5. A printer system having a Hangle, Chinese character and alphabetical character printing function, as set forth in claim 1, wherein Hangle, Chinese character emulation and font contents being mainly used are stored in an internal memory in said video controller card, while Hangle, Chinese character emulation and font contents being optionally used are stored in said cartridge memory in said another cartridge.

6. A printer system having a Hangle, Chinese character and alphabetical character printing function, as set forth in claim 1, wherein said cartridge memory in said another cartridge is a large scale integrated mask ROM of four megabits or more.

7. A printer system having a Hangle, Chinese character and alphabetical character printing function, as set forth in claim 1, wherein said cartridge memory control logic means in said another cartridge includes a plurality of small outline package type logic devices.

8. A printer system having a Hangle, Chinese character and alphabetical character printing function, as set forth in claim 6, wherein said large scale integrated mask ROM is a small outline package type device.

9. A printer system having a Hangle, Chinese character and alphabetical character printing function, as set forth in claim 1, wherein said memory access control logic means includes;
   a cartridge select signal processing module including an inverter for inverting a specific address signal A22, a first NAND gate for NANDing an output signal from said inverter and a specific address signal A23, and a second NAND gate for NANDing the address signals A22 and A23; and
   a high/low order byte select signal processing module including a first OR gate for Oring a specific address signal A0 and a read signal, and a second OR gate for Oring the read signal and a high-order byte signal.

10. A printer system having a Hangle, Chinese character and alphabetical character printing function, as set forth in claim 1 or claim 9, wherein said cartridge memory control logic means in said another cartridge includes an inverter for inverting a specific address signal A20, a first OR gate for Oring an output signal from said inverter and a cartridge select signal, and a second OR gate for Oring the address signal A20 and the cartridge select signal; and
   wherein said cartridge memory in said another cartridge includes a first four megabits mask ROM connected to an output terminal of said second OR gate in said cartridge memory control logic means and a high-order byte select signal output terminal of said memory access control logic means, for receiving addresses A1–A19 and data D8–D15 from said main means in said video controller card, a second four megabits mask ROM connected to the output terminal of said second OR gate in said cartridge memory control logic means and a low-order byte select signal output terminal of said memory access control logic means, for receiving addresses A1–A19 and data D0–D7 from said main means in said video controller card, a third four megabits mask ROM connected to an output terminal of said first OR gate in said cartridge memory control logic means and the high-order byte select signal output terminal of said memory access control logic means, for receiving addresses A1–A19 and data D0–D7 from said main means in said video controller card, and a fourth four megabits mask ROM connected to the output terminal of said first OR gate in said cartridge memory control logic means and the low-order byte select signal output terminal of said memory access control logic means, for receiving addresses A1–A19 and data D0–D7 from said main means in said video controller card.

11. A printer system having a Hangle, Chinese character and alphabetical character printing function, as set forth in claim 1 or claim 9, wherein said cartridge memory control logic means in said another cartridge includes an AND gate for ANDing a high-order byte select signal and a low-order byte select signal, a NOR gate for NORing the high-order byte select signal and the low-order byte select signal, and a tri-state buffer, said tri-state buffer including a control terminal connected to an output terminal of said NOR gate and an input terminal for inputting the high-order byte signal select signal; and wherein said cartridge memory in said another cartridge includes a sixteen megabits mask ROM connected to an output terminal of said AND gate, said sixteen megabits mask ROM also being connected to the output terminal of said NOR gate and an output terminal of said tri-state buffer in said cartridge memory control logic means and a cartridge select signal output terminal of said cartridge select signal processing module in said memory access control logic means, said sixteen-megabits mask ROM also for receiving addresses A1–A20 and data D0–D15 from said main means in said video controller card.

12. A printer system having a Hangle, Chinese character and alphabetical character printing function, as set forth in claim 1 or claim 9, wherein said cartridge memory control logic means in said another cartridge includes an inverter for inverting a specific address signal A21, a first OR gate for Oring an output signal from said inverter and a cartridge select signal, a second OR gate for Oring the address signal A21 and the cartridge select signal, an AND gate for ANDing a high-order byte select signal and a low-order byte select signal, a NOR gate for NORing the high-order byte select signal and the low-order byte select signal, and a tri-state buffer, said tri-state buffer including a control terminal connected to an output terminal of said NOR gate and an input terminal for inputting the high-order byte select signal; and wherein said cartridge memory in said another cartridge include a first sixteen megabits mask ROM connected to an output terminal of said second OR gate, an output terminal of said AND gate, said first sixteen megabits mask ROM also being connected to the output terminal of said NOR gate and an output terminal of said tri-state buffer in said cartridge memory control logic means, said first sixteen megabits mask ROM receiving addresses A1–A20 and data D0–D15 from said main means in said video controller card, and a second sixteen megabits mask ROM connected to an output terminal of said first OR gate, said second sixteen megabits mask ROM also being connected to the output terminal of said AND gate, the output terminal of said NOR gate and the output terminal of said tri-state buffer in said cartridge memory control logic means, said second sixteen megabits mask ROM for receiving addresses A1–A20 and data D0–D15 from said main means in said video controller card.

13. A printer system having a Hangle, Chinese character and alphabetical character printing function, as set forth in claim 1 or claim 9, wherein said cartridge memory control logic means in said another cartridge includes an AND gate for ANDing a high-order byte select signal and a low-order byte select signal, a NOR gate for NORing the high-order byte select signal and the low-order byte select signal, and a tri-state buffer, said tri-state buffer including a control terminal connected to an output terminal of said NOR gate and an input terminal for inputting the high-order byte select signal; and wherein said cartridge memory in said another cartridge includes a thirty-two megabits mask ROM connected to an output terminal of said AND gate, said thirty-two megabits mask ROM also being connected to the output terminal of said NOR gate and an output terminal of said tri-state buffer in said cartridge memory control logic means and a cartridge select signal output terminal of said cartridge select signal output terminal of said cartridge select signal processing module in said memory access control logic means, said thirty-two megabits mask ROM for receiving addresses A1–A21 and data D0–D15 from said main means in said video controller card.

* * * * *